(12) United States Patent
Shin et al.

(10) Patent No.: US 12,470,375 B2
(45) Date of Patent: Nov. 11, 2025

(54) METHOD AND DEVICE FOR QUANTUM KEY DISTRIBUTION

(71) Applicant: KT CORPORATION, Gyeonggi-do (KR)

(72) Inventors: Jeonghwan Shin, Gyeonggi-do (KR); Kyung-Woon Lee, Gyeonggi-do (KR); Min Soo Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 141 days.

(21) Appl. No.: 18/032,006

(22) PCT Filed: Oct. 8, 2021

(86) PCT No.: PCT/KR2021/013930
§ 371 (c)(1),
(2) Date: Apr. 14, 2023

(87) PCT Pub. No.: WO2022/080784
PCT Pub. Date: Apr. 21, 2022

(65) Prior Publication Data
US 2023/0396421 A1 Dec. 7, 2023

(30) Foreign Application Priority Data
Oct. 14, 2020 (KR) .......... 10-2020-0132549

(51) Int. Cl.
*H04L 9/08* (2006.01)
*H04B 10/70* (2013.01)
*H04L 9/40* (2022.01)

(52) U.S. Cl.
CPC .......... *H04L 9/0852* (2013.01); *H04L 9/0819* (2013.01); *H04L 9/0855* (2013.01);
(Continued)

(58) Field of Classification Search
CPC . H04L 63/08; H04L 63/0819; H04L 63/0852; H04L 63/0855; H04L 63/0869; H04L 63/06; H04L 63/062; H04B 10/70
See application file for complete search history.

(56) References Cited

U.S. PATENT DOCUMENTS

2007/0065155 A1 3/2007 Luo et al.
2008/0101612 A1* 5/2008 Imai .................. H04L 9/0852
380/278
(Continued)

FOREIGN PATENT DOCUMENTS

EP 3220574 A1 9/2017
EP 3185463 B1 8/2019
(Continued)

OTHER PUBLICATIONS

Korean Intellectual Property Office, Office Action of corresponding KR Patent Application No. 10-2020-0132549, May 9, 2024.
(Continued)

*Primary Examiner* — Shaqueal D Wade-Wright
(74) *Attorney, Agent, or Firm* — IP Legal Services, LLC

(57) ABSTRACT

Provided are a method and a device for quantum key distribution. The quantum key distribution device may be connected to another quantum key distribution device through a quantum channel and distribute a quantum cryptography key. The device may include an optical unit having an optical element to transmit information, and a post-processor for calculating a quantum cryptography key by processing a random number generated by the optical unit. The device may include at least one of the optical unit including a plurality of unit optical modules, the post-processor having a plurality of unit post-processing mod-
(Continued)

ules, and the optical unit having a plurality of unit optical modules, and the optical unit having a plurality of unit optical modules and the post-processor having a plurality of unit post-processing modules.

12 Claims, 11 Drawing Sheets

(52) U.S. Cl.
CPC ............ *H04L 9/0869* (2013.01); *H04B 10/70* (2013.01); *H04L 63/062* (2013.01)

(56) References Cited

U.S. PATENT DOCUMENTS

| | | |
|---|---|---|
| 2010/0074447 A1 | 3/2010 | Luo et al. |
| 2011/0150226 A1 | 6/2011 | Cho |
| 2012/0002968 A1 | 1/2012 | Luo et al. |
| 2012/0177201 A1 | 7/2012 | Ayling et al. |
| 2013/0101119 A1 | 4/2013 | Nordholt et al. |
| 2013/0101121 A1 | 4/2013 | Nordholt et al. |
| 2013/0272524 A1 | 10/2013 | Hughes et al. |
| 2016/0013936 A1 | 1/2016 | Hughes et al. |
| 2016/0062735 A1* | 3/2016 | Wilber .................... G06F 40/35 708/250 |
| 2016/0065365 A1 | 3/2016 | Nordholt et al. |
| 2016/0142203 A1* | 5/2016 | Tanizawa .............. H04L 9/0852 380/280 |
| 2016/0328211 A1 | 11/2016 | Nordholt et al. |
| 2017/0264433 A1 | 9/2017 | Tanizawa |
| 2017/0324550 A1 | 11/2017 | Yuan et al. |
| 2018/0239592 A1 | 8/2018 | Nordholt et al. |
| 2020/0153619 A1 | 5/2020 | Ribordy |
| 2020/0233645 A1 | 7/2020 | Nordholt et al. |
| 2020/0280437 A1 | 9/2020 | Yuan et al. |
| 2021/0385064 A1* | 12/2021 | Guo ........................ H04L 9/001 |
| 2021/0385079 A1* | 12/2021 | Curty Alonso ......... H04L 9/085 |
| 2023/0370058 A1* | 11/2023 | Benea ..................... G06F 7/588 |

FOREIGN PATENT DOCUMENTS

| | | |
|---|---|---|
| EP | 2484045 B1 | 4/2020 |
| JP | 2009-509367 A | 3/2009 |
| JP | 2010-178303 A | 8/2010 |
| JP | 2017-169187 A | 9/2017 |
| KR | 10-2011-0071803 A | 6/2011 |
| KR | 10-2018-0035223 A | 4/2018 |
| KR | 10-2018-0056205 A | 5/2018 |
| KR | 10-2018-0122855 A | 11/2018 |
| KR | 10-2019-0004263 A | 1/2019 |
| WO | 2007/033561 A1 | 3/2007 |

OTHER PUBLICATIONS

Japan Patent Office, Office Action of corresponding JP Patent Application No. 2023-523184, May 28, 2024.
Donghai Huang et al., "Quantum Key Distribution Over Double-Layer Quantum Satellite Networks", IEEE Access, Jan. 13, 2020, pp. 16087-16098, vol. 8.
European Patent Office, European Search Report of corresponding EP Patent Application No. 21880431.8, Oct. 1, 2024.

\* cited by examiner

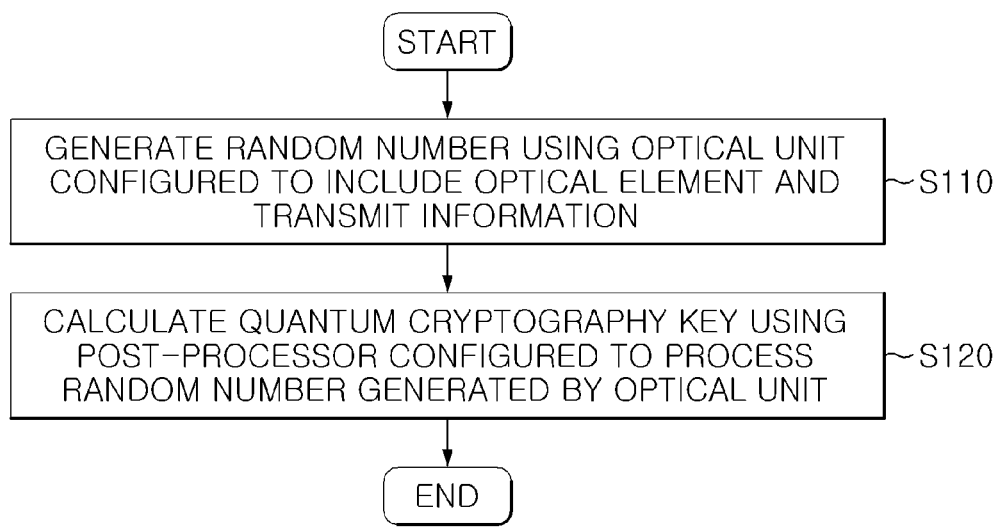

METHOD AND DEVICE FOR QUANTUM KEY DISTRIBUTION

CROSS REFERENCE TO RELATED APPLICATIONS

This application is a National Stage Patent Application of PCT International Patent Application No. PCT/KR2021/013930 (filed on Oct. 8, 2021) under 35 U.S.C. § 371, which claims priority to Korean Patent Application No. 10-2020-0132549 (filed on Oct. 14, 2020), the teachings of which are incorporated herein in their entireties by reference.

TECHNICAL FIELD

The disclosure relates to a quantum key distribution device and method. More specifically, the disclosure relates to a quantum key distribution device and method for efficiently calculating a quantum cryptography key by including a plurality of unit optical modules in an optical unit, including post-processora plurality of unit post-processing modules in a post-processor, or including post-processora plurality of unit optical modules and a plurality of unit post-processing modules in each of the optical unit and the post-processor.

BACKGROUND ART

Recently, wired and wireless communication services have become widespread and social awareness of personal information has increased. Accordingly, security issues related to communication networks have become an important issue. In particular, since security in communication networks related to countries, corporations, finance, etc., can be extended to social issues beyond individual issues, the importance of security is further emphasized.

However, with the development of hacking techniques, the secure communication has become more vulnerable to external attacks that can expose communication contents. As a next-generation security technology to complement this, quantum cryptographic communication is introduced. The quantum cryptographic communication guarantees very high security and has been gaining attention.

In this regard, intensive research is being conducted on quantum key distribution (QKD) technology for distributing a quantum key to service devices such as equipment, a terminal, etc., constituting a quantum cryptographic communication system.

More specifically, in order to distribute a quantum key using a quantum state, a QKD device transmits information using light (more precisely, a single photon having quantum properties or a light signal having a quasi-single photon) generates a quantum key, and provides it to be safe from eavesdropping by using polarization and phase among the various quantum properties of photons.

The QKD device generally includes i) an interferometer that generates a single photon (quantum state) using an optical element and encodes or decodes information on the single photon, ii) an optical unit that includes a single photon detector for detecting a single photon and converting the detected single photon into digital information, and iii) a post-processor that confirms hacking from a binary random number generated by the optical unit and generates a quantum key.

The post-processor usually processes information in the form of digital bits. Accordingly, it is possible to generate a quantum key by processing signals at a high speed using an existing information processing device and communication channel.

On the other hand, the optical unit typically has problems in that it is difficult to generate the random binary number at a high speed due to single photon generation, channel loss, and low efficiency of the single photon detector.

As described, the QKD device includes the optical unit and the post-processor, and the post-processor has sufficient processing capability. However, there is a limit to the efficient generation of the quantum key due to the slow generating rate of the binary random number in the optical unit. Furthermore, the processing capability of the post-processor is wasted.

In addition, the random number generating rate of the optical unit may vary depending on a loss rate of a quantum channel such as an optical fiber or the performance of each component module such as a single photon generator and a single photon detector. Furthermore, even when the same component module is provided, the quantum cryptography key generating rate may change while the loss rate of the quantum channel increases or decreases according to the transmission distance or the like (see FIG. 1).

Accordingly, depending on the applied communication environment, the random number generating rate of the optical unit may become faster than the processing rate of the post-processor in the QKD device. In this case, if the post-processor cannot process the binary random number generated by the optical unit in a timely mannerpost-processor, it may lead to a waste of the processing capability of the optical unit.

Therefore, in the QKD, there is a need for solutions to prevent waste of the processing capability in either the optical unit or the post-processor and to efficiently generate a quantum key for allowing smooth quantum communication, even when there is a difference between the random number generation capacity of the optical unit and the random number processing capacity of the post-processor. However, there has not yet been a proper solution proposed for this issue.

DISCLOSURE OF INVENTION

Technical Problem

Therefore, the present disclosure has been made in view of the above-mentioned problems, and the present disclosure provides a quantum key distribution device and method for preventing waste of the processing capability in either an optical unit or a post-processor and efficiently generate a quantum key for allowing smooth quantum communication, even when there is a difference between the random number generation capacity of the optical unit and the random number processing capacity of the post-processor.

Other detailed objectives of the disclosure will be clearly identified and understood by experts or researchers in the art through the specific contents described below.

Solution to Problem

In accordance with an aspect of the disclosure, a quantum key distribution device may be provided. The quantum key distribution device is connected to another quantum key distribution device through a quantum channel and distributes a quantum cryptography key. The quantum key distribution device may include an optical unit configured to have an optical element to transmit information; and a post-processor configured to calculate a quantum cryptography key by processing a random number generated by the optical unit, wherein the optical unit includes a plurality of unit optical modules, the post-processor includes a plurality of unit post-processing modules, or the optical unit and the post-processor each includes a plurality of unit optical modules and a plurality of unit post-processing modules.

The optical unit may include a single unit optical module, the post-processor may include a plurality of unit post-processing modules, and the plurality of unit post-processing modules may calculate a quantum cryptography key by processing a random number generated by the single unit optical module.

The optical unit may include a plurality of unit optical modules, the post-processor may include a single unit post-processing module, and the single unit post-processing module may calculate a quantum cryptography key by processing random numbers generated by the plurality of unit optical modules.

The optical unit may include a plurality of unit optical modules, and the post-processor may include a plurality of unit post-processing modules, so that the plurality of unit post-processing modules may calculate a quantum cryptography key by processing random numbers generated by the plurality of unit optical modules.

A random number generating rate per unit time of the unit optical module may be different from a random number processing rate per unit time of the unit post-processing module.

The post-processor may increase and decrease the number of unit post-processing modules that operate in correspondence with the optical unit according to a change in the random number generating rate per unit time of the optical unit.

The post-processor may calculate a quantum cryptography key for each protocol while operating in response to one or more protocols used in each of the unit optical modules of the optical unit.

Furthermore, the post-processor may receive information on the protocol used in each unit optical module of the optical unit, process a random number generated by each of the unit optical modules, and calculate a quantum cryptography key corresponding to each of the unit optical modules.

Each of the unit optical modules may transmit information on a link connected to a protocol that is used by each of the unit optical modules, to the post-processor.

Each of the unit optical modules of the optical unit and each of the unit post-processing modules of the post-processor may constitute a trusted node to distribute a quantum cryptography key with a second quantum key distribution device of another site.

The optical unit and the post-processor may be provided at a first site to constitute a first quantum key distribution device, and may be provided at a second site to be connected to a second quantum key distribution device including a second optical unit and a second post-processor, and may distribute a quantum cryptography key between the first quantum key distribution device and the second quantum key distribution device by processing random numbers generated by the plurality of unit optical modules included in the optical unit.

The plurality of unit optical modules may generate the random numbers using two or more different protocols.

In accordance with another aspect of the disclosure, a method may be provided for distributing a quantum cryptography key between quantum key distribution devices. The method may include generating a random number using an optical unit that includes an optical element to transmit information; and calculating a quantum cryptography key using a post-processor that processes the random number generated by the optical unit, wherein, in the quantum key distribution device, the optical unit may include a plurality of unit optical modules, the post-processor may include a plurality of unit post-processing modules, or the optical unit and the post-processor each may include a plurality of unit optical modules and a plurality of unit post-processing modules.

Advantageous Effects of Invention

According to embodiments of the disclosure, a quantum key distribution device and method may efficiently generate a quantum cryptography key by including a plurality of unit optical modules in the optical unit, post-processor including a plurality of unit post-processing modules the post-processor thereof, or including a plurality of unit optical modules and a plurality of unit post-processing module in each of the optical unit and the post-processing module.

BRIEF DESCRIPTION OF DRAWINGS

The accompanying drawings, which are included as part of the detailed description to aid understanding of the disclosure, provide examples of the disclosure, and explain the technical idea of the disclosure together with the detailed description.

FIG. 10 is a flowchart illustrating a quantum key distribution method according to an embodiment of the disclosure.

BEST MODE FOR CARRYING OUT THE INVENTION

The present disclosure can apply various modifications and can have various embodiments. Hereinafter, specific embodiments will be described in detail based on the accompanying drawings.

The following embodiments are provided to facilitate a comprehensive understanding of the method, apparatus and/or system described in this specification. However, this is only an example and the present disclosure is not limited thereto.

In describing the exemplary embodiments of the present disclosure, a detailed description of the known art related to the present disclosure will be omitted when it is judged that the detailed description may unnecessarily make the gist of the present invention unclear. In addition, terms to be described below as terms which are defined in consideration of functions in the present invention may vary depending on the intention of a user or an operator or usual practice. Accordingly, the terms need to be defined based on contents throughout this specification. Terms used in a detailed description are to just describe the exemplary embodiments of the present disclosure and should not be restrictive in any way. Unless specifically used otherwise, expression of a singular form includes a meaning of a plural form. In the present description, an expression such as "including" or "comprising" is intended to indicate certain features, numbers, steps, operations, elements, some or combinations thereof and should not be construed to preclude the presence or possibility of one or more other features, numbers, steps, operations, elements, some or combinations thereof in addition to the described things.

In addition, terms including as first, second, and the like are used for describing various constituent elements, but the constituent elements are not limited by the terms and the terms are used only for distinguishing one constituent element from other constituent elements.

Hereinafter, a quantum key distribution method and device according to an embodiment of the present disclosure will be sequentially described with reference to the accompanying drawings.

Figure 1:
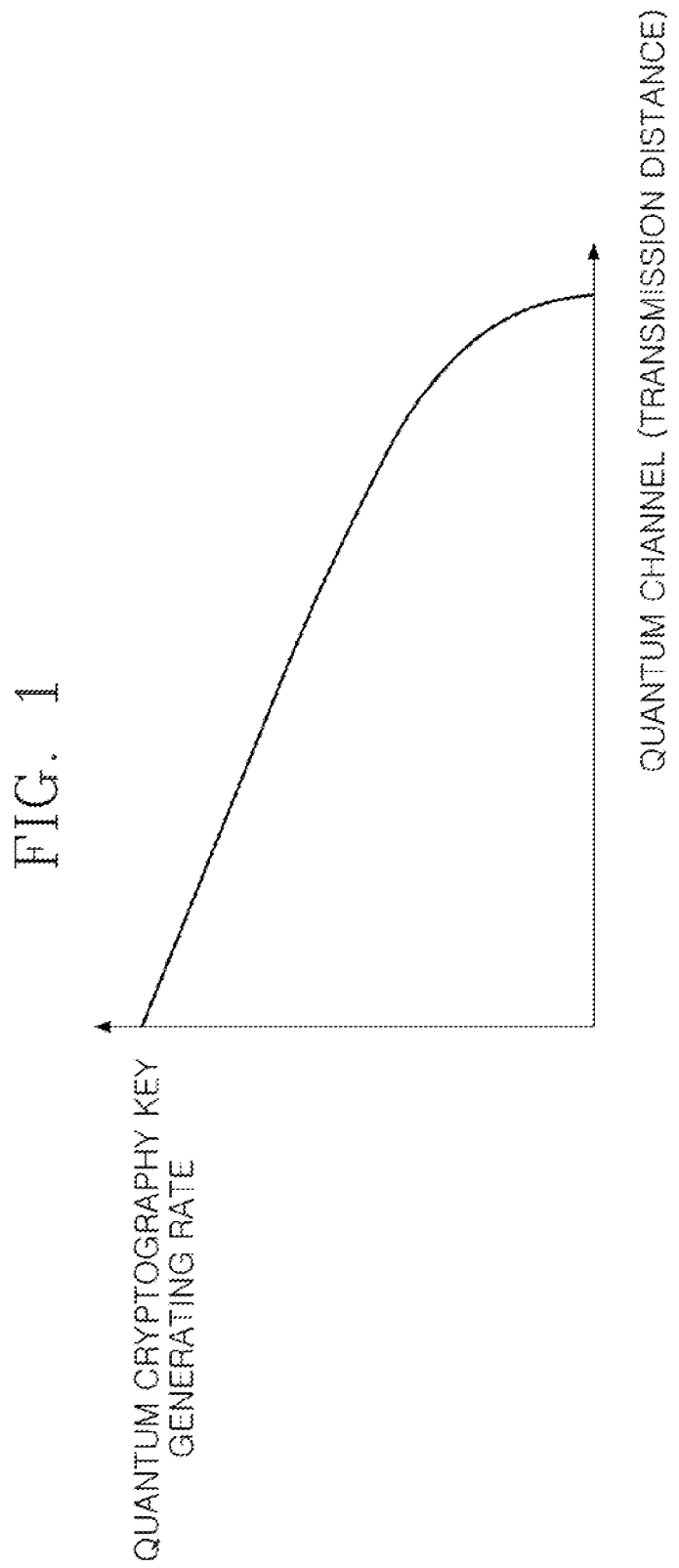
FIG. 1 is a graph illustrating a quantum cryptography key generating rate according to a transmission distance in a typical quantum key distribution device.
Figure 2:
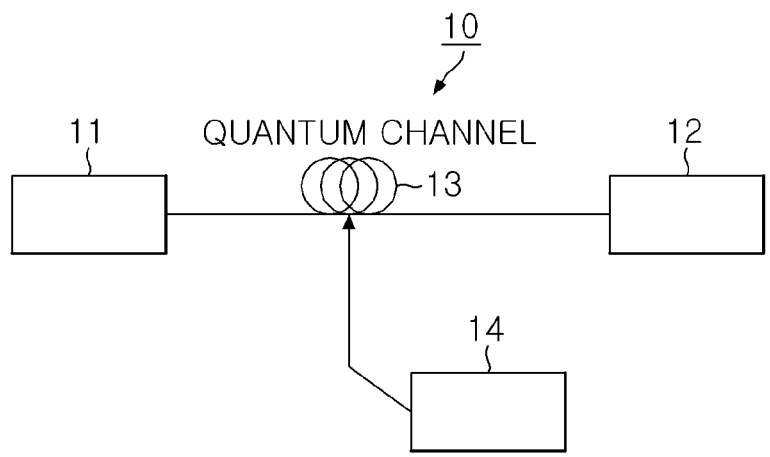
FIG. 2 is a diagram illustrating a quantum cryptography key communication system according to an embodiment of the disclosure.

FIG. 2 illustrates a quantum cryptographic communication system 10 according to an embodiment of the disclosure. Referring to FIG. 2, the quantum cryptographic communication system 10 according to an embodiment of the disclosure may include a transmitter 11, a receiver 12, and a quantum channel 13. The transmitter 11 and the receiver 12 may generate and share a quantum cryptography key while exchanging optical signals through the quantum channel 13.

The transmitter 11 and the receiver 12 may be i) servers, ii) clients or terminal devices connected to the server, iii) communication devices such as gateways and routers, or iv) portable devices having mobility. In addition, the transmitter 11 and the receiver 12 may be various devices capable of performing communication by generating and sharing a quantum cryptography key.

In addition, the quantum channel 13 may be provided between the transmitter 11 and the receiver 12 to transmit optical signals. The quantum channel 13 may be configured with an optical fiber. However, the embodiments of the present disclosure are not limited thereto. For example, the quantum channel 13 may be any medium capable of transmitting an optical signal.

Accordingly, the transmitter 11 and the receiver 12 may exchange information necessary for generating a quantum cryptography key using the phase, polarization, etc., of the optical signal through various protocols such as a BB84 protocol, and generate and share a quantum cryptography key, so that it is possible to effectively prevent an attacker 14 from attempting to steal the quantum encryption key and hacking.

Furthermore, in the quantum cryptographic communication system 10, the security of the communication system can be enhanced by performing communication by performing encryption and decryption using a quantum cryptography key generated through a quantum key distribution (QKD) device.

More specifically, the transmitter 11 and the receiver 12 may include a QKD device and a quantum key management (QKM) device. The QKM device may separate the quantum cryptography key from a quantum key stream generated by the QKD device and provide the separated quantum cryptography key to an application.

Figure 3:
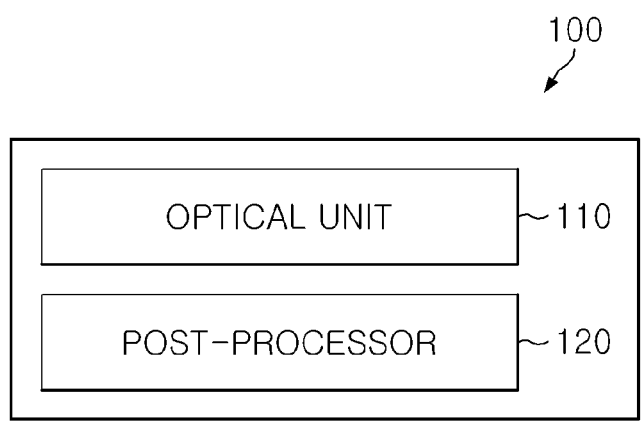
FIG. 3 is a block diagram illustrating a quantum key distribution device according to an embodiment of the disclosure.

As shown in FIG. 3, the QKD device 100 may include i) an interferometer that generates a single photon (quantum state) using an optical element and encodes/decodes information on the single photon, ii) an optical unit 110 that includes a single photon detector for detecting a single photon and converting the detected single photon into digital information, and iii) a post-processor 120 that confirms hacking from a binary random number generated by the optical unit 110 and generates a quantum key.

In the QKD device 100 according to an embodiment of the disclosure, the optical unit 110 may include a plurality of unit optical modules 111, or the post-processor 120 may include a plurality of unit post-processing modules 121, or the optical unit 110 and the post-processor 120 may each include a plurality of unit optical modules 111 and a plurality of unit post-processing modules 121, thereby more efficiently calculating the quantum cryptography key.

In contrast, since a typical QKD device may process signals at a high speed using an existing information processing device and communication channel to generate a quantum cryptography key because a post-processor processes information using digital bits, On the other hand, the optical unit 110 usually cannot generate the binary random number at a high speed due to single photon generation and channel loss, low efficiency of the single photon detector, etc. Accordingly, even though the post-processor or 120 has sufficient processing capability, the quantum cryptography key cannot be efficiently generated due to the furthermore, the processing capacity of the post-processor 120 may be wasted.

Furthermore, the random number generating rate of the optical unit 110 becomes faster than the random number processing rate of the post-processor 120 depending on the transmission distance or loss rate of the quantum channel 13 and the performance of the constituent modules of the optical unit 110, etc. In this case, if the binary random number generated by the optical unit 110 cannot be processed in a timely manner by the post-processor 120, it may lead to a waste of the processing capability of the optical unit 110.

Figure 4A:
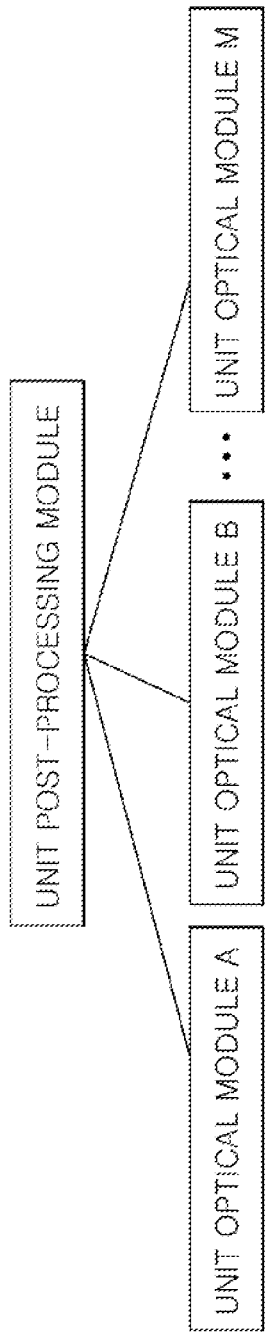
FIGS. 4A to 4C, 5 to 7 are diagrams illustrating a quantum key distribution device according to an embodiment of the disclosure.
Figure 4B:
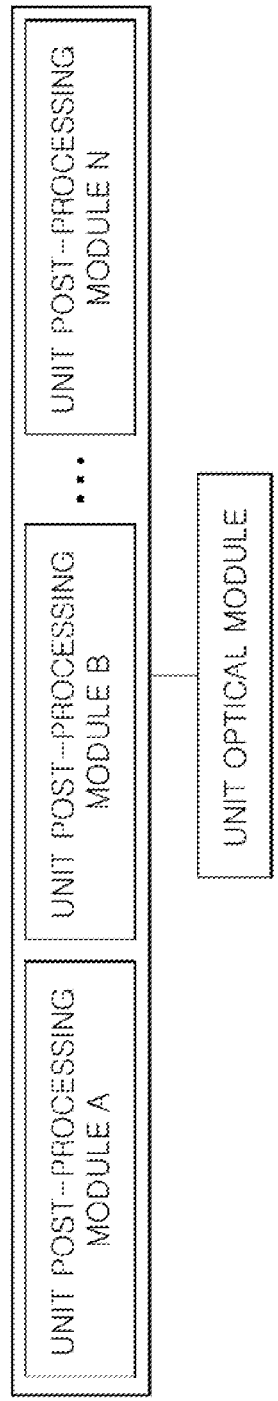
Figure 4C:
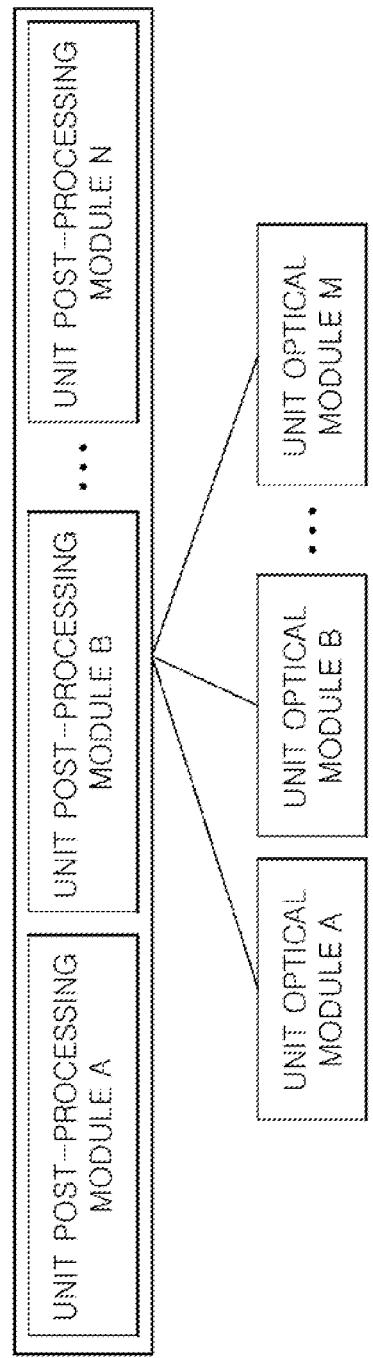

In this regard, the QKD device 100 according to an embodiment of the disclosure shown in FIGS. 4A to 4C, includes the optical unit 110 having a plurality of unit optical modules 111 (FIG. 4A), or the post-processor 120 having a plurality of unit post-processing modules 121 (FIG. 4B), or the optical unit 110 and the post-processor 120 each having the plurality of unit optical modules 111 and the plurality of unit post-processing modules 121 (FIG. 4C), in order to more efficiently calculate a quantum cryptography key.

Figure 5:
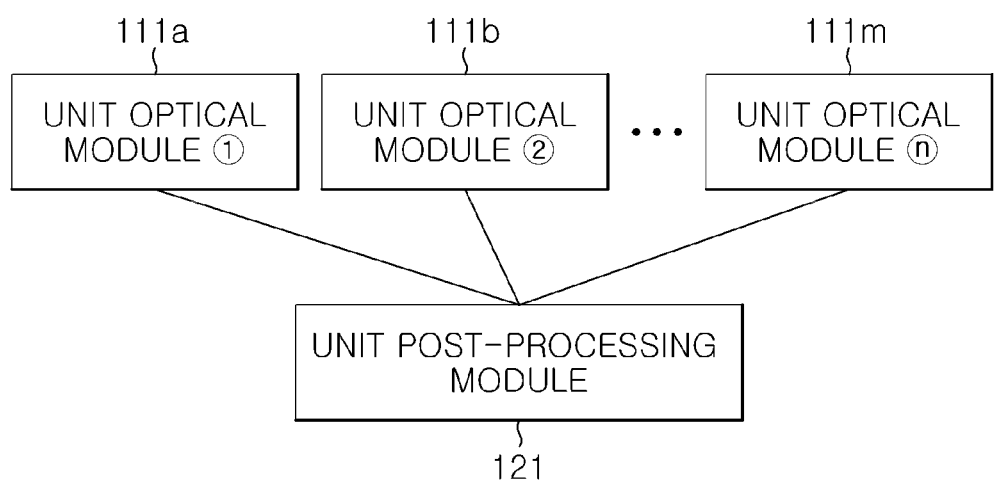

More specifically, FIG. 5 illustrates a configuration and operation of a QKD device 100 including a post-processor having a plurality of unit optical modules as shown in FIG. 4A. Referring to FIG. 5, the QKD device 100 according to an embodiment of the disclosure may include the optical unit 110 configured to include an optical element to transmit information, and the post-processor 120 configured to process a random number generated by the optical unit 110.

As shown in FIG. 5, the optical unit 110 may include a plurality of unit optical modules 111a, 111b, . . . , and 111m, and the post-processor 120 may include a single unit post-processing module 121, so that the single unit post-processing module 121 may calculate a quantum cryptography key by processing random numbers generated by the plurality of unit optical modules 111a, 111b, . . . , and 111m.

Here, the optical unit 110 and the post-processor 120 may be implemented as one physical device. However, the embodiments of the disclosure are not limited thereto. The optical unit 110 and the post-processor 120 may be implemented as devices physically separated from each other and may be connected through a cable or the like to interlock with each other.

In addition, the plurality of unit optical modules 111a, 111b, . . . , and 111m included in the optical unit 110 may also be implemented as one physical device, but the embodiments of the disclosure are not limited thereto. The plurality of unit optical modules 111a, 111b, . . . , and 111m may be implemented as modules physically separated from each other.

Accordingly, in the QKD device 100 according to an embodiment of the disclosure, the single unit post-processing module 121 may process the random numbers generated by the plurality of unit optical modules 111a, 111b, . . . , and 111m, and accordingly, when the processing capacity of the unit post-processing module 121 is sufficient, it is possible to prevent the processing capacity from being wasted and efficiently calculate a quantum cryptography key.

Furthermore, some or all of the plurality of unit optical modules 111a, 111b, . . . , and 111m may operate with different protocols. Accordingly, the unit post-processing module 121 may calculate a quantum cryptography key with a protocol corresponding to each of the unit optical modules 111.

Accordingly, in the QKD device 100 according to an embodiment of the disclosure, the single unit post-processing module 121 may calculate a quantum cryptography key corresponding to each of the unit optical modules 111 by processing the random numbers generated by the plurality of unit optical modules 111. Therefore, the quantum cryptography key may be more efficiently generated by the QKD device 100. Furthermore, the issue of wasting the processing capacity of the post-processor 120 may be improved.

Figure 6:
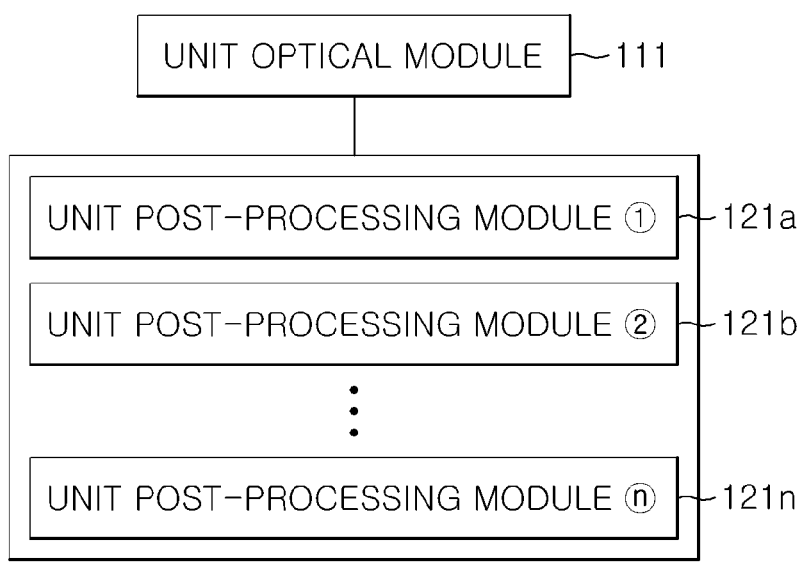

FIG. 6 illustrates a configuration and operation of an QKD device 100 having a plurality of unit post-processing modules and a single unit optical module shown in FIG. 4B. As shown in FIG. 6, the QKD device 100 according to an embodiment of the disclosure may include an optical unit 110 configured to include an optical element and transmit information and a post-processor 120 configured to process a random number generated by the optical unit 110. According to an embodiment, the optical unit 110 may include a single unit optical module 111, and the post-processor 120 may include a plurality of unit post-processing modules 121a, 121b, . . . , and 121n, so that the plurality of unit post-processing modules 121a, 121b, . . . , and 121n may process a random number generated by the single unit optical module 111 to calculate a quantum cryptography key.

As shown in FIG. 6, in the QKD device 100 according to an embodiment of the disclosure, the plurality of unit post-processing modules 121a, 121b, . . . , and 121n may process the random number generated by the single unit optical module 111. Accordingly, even when the random number generating rate per unit time of the unit optical module 111 is faster than the random number processing rate per unit time of the unit post-processing module 121, the post-processor 120 may use the plurality of unit post-processing modules 121a, 121b, . . . , and 121n to prevent processing delay of the random number generated by the unit optical module 111 and to efficiently calculate a quantum cryptography key.

Here, the optical unit 110 and the post-processor 120 may be implemented as one physical device, but the embodiments of the disclosure are not limited thereto. For example, the optical unit 110 and the post-processor 120 may be implemented as devices physically separated from each other and connected to each other through a cable or the like to interlock with each other.

In addition, the plurality of unit post-processing modules 121a, 121b, . . . , and 121n included in the post-processor 120 may also be implemented as one physical device, but the embodiments of the disclosure are not limited thereto. For example, the plurality of unit post-processing modules 121a, 121b, . . . , and 121n that are physically independent of each other may interlock with each other to be implemented as the post-processor 120. Furthermore, in the post-processor 120, the plurality of unit post-processing modules 121a, 121b, . . . , and 121n may be configured in a manner of cloud computing, thereby more flexibly and efficiently processing the random number generated by the optical unit 110.

As described, in the QKD device 100 according to an embodiment of the disclosure, the plurality of unit post-processing modules 121a, 121b, . . . , and 121n may process the random number generated by the single unit optical module 111. Accordingly, it is possible to prevent processing delay of the random number generated by the unit optical module 111 and to efficiently calculate a quantum cryptography key.

Figure 7:
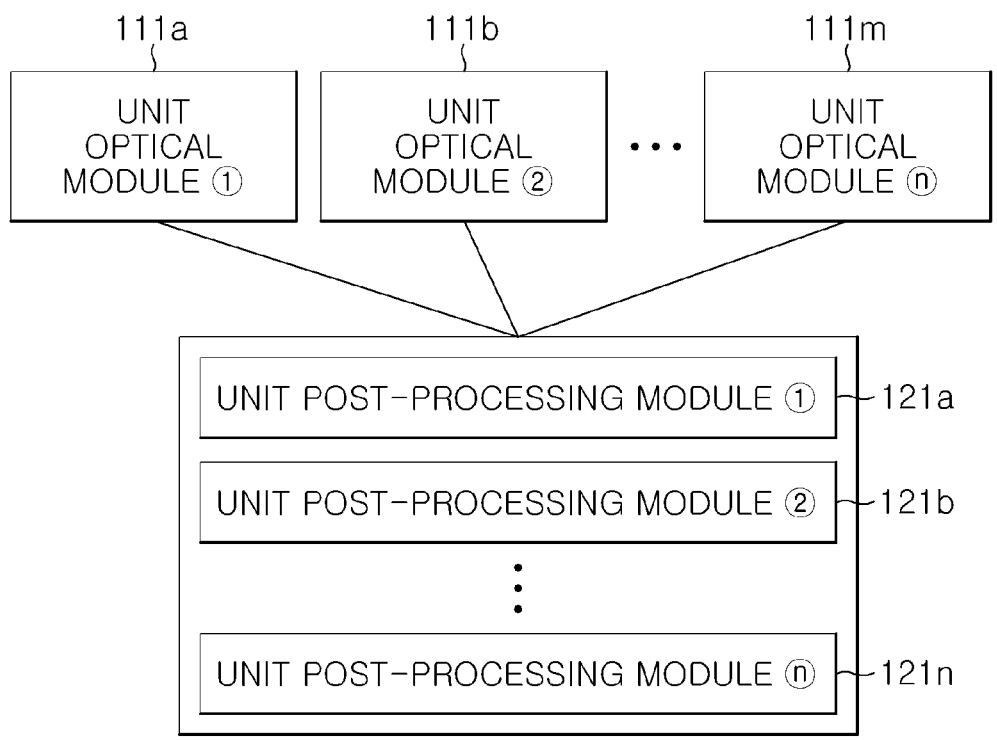

FIG. 7 illustrates a configuration and operation of the QKD device 100 including a plurality of unit post-processing modules and a plurality of unit optical modules shown in according to the case of FIG. 4C. As shown in FIG. 7, the QKD device 100 according to an embodiment of the disclosure may include an optical unit 110 configured to include an optical element to transmit information and a post-processor 120 configured to process a random number generated by the optical unit 110. In this embodiment, the optical unit 110 may include a plurality of unit optical modules 111a, 111b, . . . , and 111m, and the post-processor 120 may include a plurality of unit post-processors 121a, 121, . . . , and 121n, so that the plurality of unit post-processing modules 121a, 121b, . . . , and 121n may process random numbers generated by the plurality of unit optical modules 111a, 111b, . . . , and 111m to calculate a quantum cryptography key.

Here, the optical unit 110 and the post-processor 120 may be implemented as one physical device, but the embodiments of the disclosure are not limited thereto. For example, the optical unit 110 and the post-processor 120 may be implemented as devices physically separated from each other and connected through a cable or the like to interlock with each other.

In addition, each of the plurality of unit optical modules 111a, 111b, . . . , and 111m provided in the optical unit 110 may also be implemented as a single physical device, but the disclosure is not necessarily limited thereto, and the plurality of unit optical modules 111a, 111b, . . . , and 111n may be implemented as physically independent modules.

In addition, the plurality of unit post-processing modules 121a, 121b, . . . , and 121n included in the post-processor 120 may also be implemented as one physical device, but the embodiments of the disclosure are not limited thereto. For example, the plurality of unit post-processing modules 121a, 121b, . . . , and 121n that are physically independent of each other may interlock with each other to be implemented as the post-processor 120. Furthermore, in the post-processor 120, the plurality of unit post-processing modules 121a, 121b, . . . , and 121n may be configured like cloud computing, thereby more flexibly and efficiently processing the random number generated by the optical unit 110.

Furthermore, in the QKD device 100 according to an embodiment of the disclosure, the post-processor 120 may increase and decrease the number of unit post-processing modules 121 that operate in correspondence with the optical unit 110 according to a change in the random number generating rate per unit time of the optical unit 110. Accordingly, it is also possible to adjust the processing capacity of the post-processor 120 not to be wasted without processing delay of the random number generated by the optical unit 110.

Furthermore, some or all of the plurality of unit optical modules 111a, 111b, . . . , and 111n may operate with different protocols. Accordingly, the post-processing module 120 may calculate a quantum cryptography key with a protocol corresponding to each of the unit optical modules 111.

As described, even when the random number generating rate per unit time of the unit optical module 111 may be different from the random number processing rate per unit time of the unit post-processing module 121, the QKD device 100 according to an embodiment may efficiently process the random number to calculate a quantum cryptography key. Furthermore, even when the generating rate of the random number generated by the optical unit 110 is changed, it is possible to efficiently generating the quantum cryptography key while flexibly changing the configuration and operation of the post-processor 120.

Mode for Implementing the Invention

Figure 8:
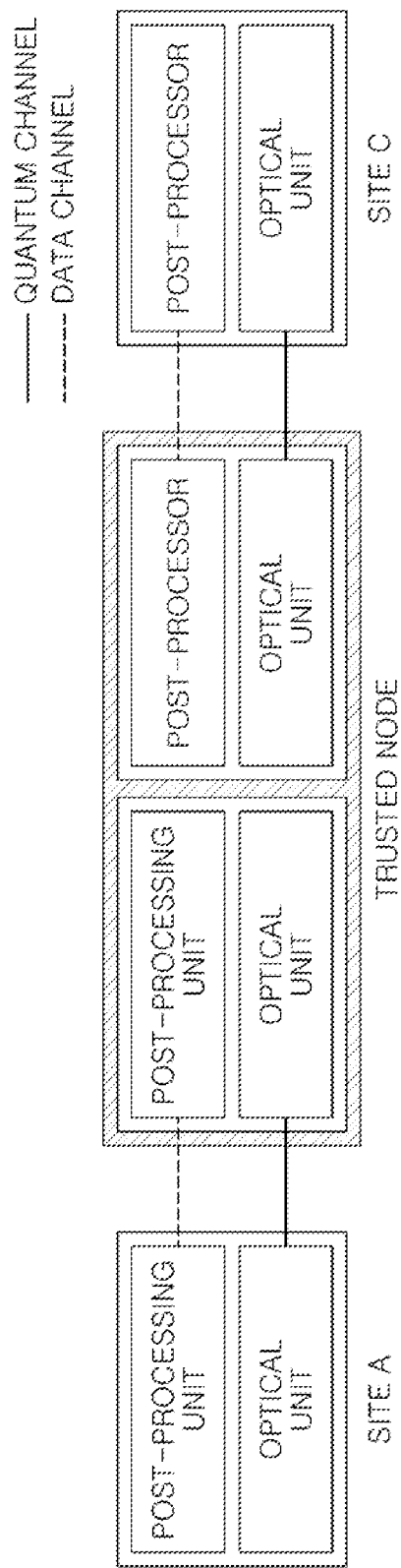
FIGS. 8 and 9 are diagrams for explaining an operation of a quantum key distribution device according to an embodiment of the disclosure.
Figure 9:
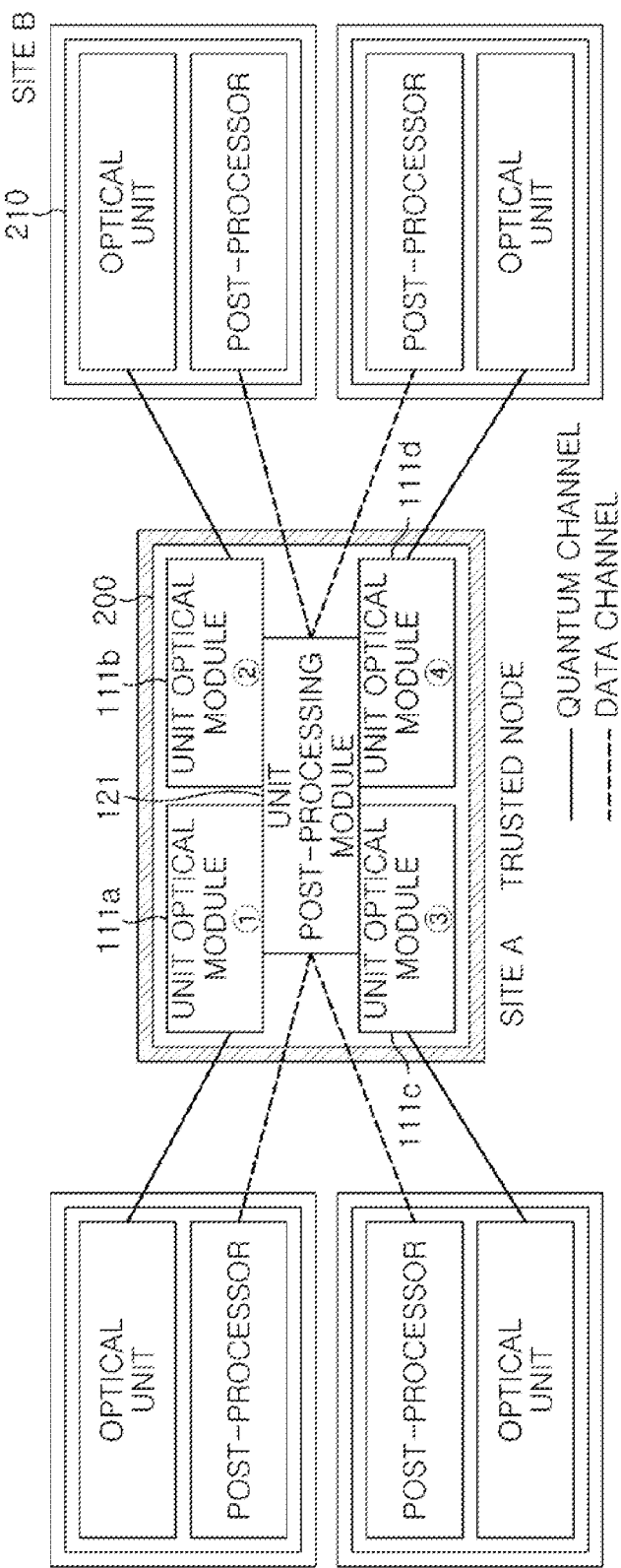

FIGS. 8 and 9 illustrate a configuration and operation of the QKD device 100 according to an embodiment of the disclosure.

Hereinafter, with reference to FIGS. 8 and 9, the configuration and operation of the quantum key management device 100 according to an embodiment of the disclosure will be described in more detail.

First, the quantum key management device 100 according to an embodiment of the disclosure may include an optical unit 110 configured to include an optical element to transmit information and a post-processor 120 configured to calculate a quantum cryptography key by processing a random number generated by the optical unit 110.

The optical element may include a light source, an interfere that generates a single photon (or quasi-single photon) from light generated by the light source and encodes or decodes information for generating a quantum cryptography key in the single photon, and a single photon detector that detects the single photon and converts the detected single photon into digital information.

Accordingly, the optical unit 110 may include the optical element to transmit the information for generating the quantum cryptography key to the optical unit 110 of the QKD device 100 provided on the other side.

In this regard, the post-processor 120 may calculate a quantum cryptography key by processing the random number generated by the optical unit 110.

In the QKD device 100 according to an embodiment of the disclosure, the optical unit 110 may include a plurality of unit optical modules 111, the post-processor 120 may include a plurality of unit post-processing modules 121, or the optical unit 110 and the post-processor 120 may each include the plurality of unit optical modules 111 and the plurality of unit post-processing modules 121, thereby more efficiently generating the quantum cryptography key.

Here, in the quantum key management device 100 according to an embodiment of the disclosure, the optical unit 110 and the post-processor 120 may be configured as one physical device, but the present disclosure is not necessarily limited thereto. It is also possible to divide the optical unit 110 and the post-processor 120 into two or more physical devices and operate them in conjunction with each other.

Furthermore, in the quantum key management device 100 according to an embodiment of the disclosure, the post-processor 120 may calculate each quantum cryptography key in response to one or more protocols used by the optical unit 110.

More specifically, in FIG. 5, a first unit optical module 110a of the optical unit 110 may use a BB84 protocol and a second unit optical module 110b may use a coherent one way (COW) protocol. Accordingly, the unit post-processing module 121 of the post-processor 120 may calculate a quantum cryptography key by processing a random number generated by the first unit optical module 110a according to the BB84 protocol and may calculate a quantum cryptography key by processing a random number generated by the second unit optical module 110b according to the COW protocol.

Accordingly, the post-processor 120 is required to have a structure that can handle all of the plurality of protocols so that a post-processing may be performed in correspondence with the plurality of protocols used in each of the unit optical modules 111 of the optical unit 110 and a quantum cryptography key may be calculated.

More specifically, the post-processor 120 may receive information such as an identifier for a protocol used by each of the unit optical modules 111 of the optical unit 110. The post-processor 120 may calculate a quantum cryptography key corresponding to each of the unit optical modules 111 by processing the random number generated by each of the unit optical modules 111.

The post-processor 120 may receive information on the protocol used by the post-processor 120 from the plurality of unit optical modules 111 and may generate a quantum cryptography key by processing the random numbers generated by the plurality of unit optical modules 111, but the embodiments of the disclosure are not limited thereto. The post-processor 120 may also receive information on the protocol used in the plurality of unit optical modules 111 from a separate external device such as a control server for controlling the quantum cryptography key distribution system, or the like.

In addition, the post-processor 120 may receive information on a link to which the plurality of unit optical modules 111 are connected together with the protocol used by the plurality of unit optical modules 111, thereby generating a quantum cryptography key corresponding to the link.

Accordingly, in the QKD device 100 according to an embodiment of the disclosure, even when different protocols are used in the plurality of unit optical modules 111, the post-processor 120 may distinguish the protocols of the unit optical modules 111 from each other to perform different post-processing and generate a quantum cryptography key for each link.

In addition, in the QKD device 100 according to an embodiment of the disclosure, the optical unit 110 and the post-processor 120 may constitute a trusted node, thereby distributing a quantum cryptography key with a second QKD device of another site.

More specifically, in the related art, as shown in FIG. 8, a method of extending a transmission distance using a trusted node has been attempted for long-distance quantum cryptography key distribution.

However, as shown in FIG. 8, even in the above case, the processing capacity of the optical unit 110 or post-processor 120 of the QKD device 100 constituting the trusted node may be wasted, and the quantum cryptography key may not be efficiently generated.

For a more specific example, when the random number processing capability of the post-processor 120 is higher than the random number generating capability of the optical unit 110, the processing capability of the post-processor 120 may be wasted, and the quantum cryptography key generated compared to the processing capability of the post-processor 120 may also be insufficient.

In this regard, in the present disclosure, as shown in FIG. 9, the optical unit 110 and the post-processor 120 may constitute a trusted node to distribute a quantum cryptography key with a second QKD device 210 of another site (Site B).

In this embodiment, the plurality of unit optical modules 111a, 111b, 111c, and 111d of the optical unit 110 and the unit post-processing modules 121 of the post-processor 120 may constitute a first QKD device 200 provided in a first site (Site A).

In the case of a trusted node connected to four nodes as shown in FIG. 9, four QKD devices 100 each including the optical unit 110 and the post-processor 120 are typically required according to a related art. However, it is possible to constitute a trusted node with only one unit post-processing module 121 and four unit optical modules 111a, 111b, 111c, and 111d connected to each node according to an embodiment.

In the QKD device 100 according to an embodiment of the disclosure, the optical unit 110 and the post-processor 120 may be provided in the first site (Site A) to constitute the first QKD device 200.

At this time, the first QKD device 200 may be connected to a second QKD device 210 including another optical unit 110 provided in the second site (Site B) and another post-processor 120, thereby distributing a quantum cryptography key between the first QKD device 200 and the second QKD device 210.

Furthermore, the plurality of unit optical modules 111a, 111b, 111c, and 111d may generate the random number using two or more different protocols.

In the present disclosure, the first QKD device 200 and the second QKD device 210 may be connected to the plurality of unit optical modules 111 and may distribute a quantum cryptography key by simultaneously processing the random numbers generated by the plurality of unit optical modules 111. Accordingly, it is possible to increase the generating speed of the quantum cryptography key.

Furthermore, in the present disclosure, the first QKD device 200 and the second QKD device 210 may simultaneously process the random numbers generated by the plurality of unit optical modules 111 to distribute the quantum cryptography key. Even if some of the plurality of unit optical modules 111 are exposed to hacking, the random numbers generated by the remaining unit optical modules 111 may be safely generated. Therefore, it is possible to more efficiently prevent an attacker 14 from obtaining the quantum cryptography key.

In particular, when different protocols are used in the plurality of unit optical modules 111, it becomes more difficult for the attacker 14 to obtain the quantum cryptography key.

Furthermore, in the present disclosure, even if a problem occurs in some unit optical modules 111 among the plurality of unit optical modules 111 or in the quantum channel 13 connecting them, random numbers may be effectively generated in the remaining unit optical modules 111. Therefore, even if some unit optical modules 110 or some quantum channels 13 have a problem, it is possible to ensure redundancy for continuously distributing a quantum cryptography key without interruption.

FIG. 10 illustrates a flowchart illustrating a quantum key distribution method according to an embodiment of the disclosure.

As shown in FIG. 10, the quantum key distribution method according to an embodiment of the present disclosure for distributing a quantum cryptography key between the QKD device 100 may include generating (S110) a random number using an optical unit 110 configured to include an optical element to transmit information; and calculating (S120) a quantum cryptography key using a post-processor 120 configured to process a random number generated by the optical unit 110. In this case, in the QKD device 100, the optical unit 110 may include a plurality of unit optical modules 111, or the post-processor 120 may include a plurality of unit post-processing modules 121, or the optical unit 110 and the post-processor 120 may each include the plurality of unit optical modules 111 and the plurality of unit post-processing modules 121.

The quantum key distribution method according to an embodiment of the disclosure has been described in detail in the QKD device 100 according to an embodiment of the disclosure with reference to FIGS. 1 to 9, and a detailed description thereof will be omitted and a brief overview is given focusing on the core configuration.

At this time, the quantum key distribution method according to an embodiment of the disclosure has been described in detail in the QKD device 100 according to an embodiment of the disclosure with reference to FIGS. 1 to 9, and redundant detailed description will be omitted.

In addition, a computer program according to another embodiment of the disclosure is characterized in that it is a computer program stored in a computer-readable medium in order to execute each step of the method of distributing a quantum cryptography key described above on a computer. The computer program may be a computer program including machine language code generated by a compiler, as well as a computer program including high-level language code that can be executed on a computer using an interpreter or the like. At this time, the computer is not limited to a personal computer (PC) or a notebook computer, and is equipped with a central processing unit (CPU) such as a server, communication equipment, smart phone, tablet PC, PDA, mobile phone, etc. to execute a computer program. of the information processing device. In addition, the computer-readable medium is an electronic recording medium (e.g., ROM, flash memory, etc.), a magnetic storage medium (e.g., floppy disk, a hard disk, etc.), an optical reading medium (e.g., CD-ROM, DVD, etc.) and carrier waves (e.g., transmission through the Internet), including all storage media that can be read by a computer.

Therefore, in the quantum key distribution device and method according to an embodiment of the disclosure, the optical unit 120 of the quantum key distribution device 100 may include a plurality of unit optical modules 121, or the post-processor 120 thereof may include a plurality of unit post-processing modules 121, or the optical unit 110 and the post-processing module 120 may each include the plurality of unit optical modules 111 and the plurality of unit post-processing module 121, thereby more efficiently generating a quantum cryptography key.

The above description is merely an example of the technical idea of the present inventive concept, and various modifications and variations can be made to those skilled in the art without departing from the concept of the present inventive concept. Accordingly, the above-described embodiments are not intended to limit the technical idea of the present inventive concept, and the scope of the technical idea of the present inventive concept is not limited by the embodiments. The scope of protection of the present inventive concept should be interpreted according to claims, and all technical ideas equivalent thereto should be interpreted as being included in the scope of the disclosure.

The invention claimed is:

1. A quantum key distribution device connected to another quantum key distribution device through a quantum channel and distributing a quantum cryptography key, the quantum key distribution device comprising:
   an optical unit configured to have an optical element to transmit information and generate a random number; and
   a post-processor configured to calculate a quantum cryptography key by processing the generated random number by the optical unit,
   wherein the quantum key distribution device have one of i) the optical unit including a plurality of unit optical modules, ii) the post-processor including a plurality of unit post-processing modules, and iii) the optical unit having a plurality of unit optical modules and the post-processor having a plurality of unit post-processing modules, and
   wherein the post-processor increases or decreases the number of unit post-processing modules that operate in correspondence with the optical unit according to a change in the random number generating rate per unit time of the optical unit.

2. The quantum key distribution device of claim 1, wherein
   the optical unit includes a single unit optical module,
   the post-processor includes a plurality of unit post-processing modules, and
   the plurality of unit post-processing modules calculate a quantum cryptography key by processing a random number generated by the single unit optical module.

3. The quantum key distribution device of claim 1, wherein
   the optical unit includes a plurality of unit optical modules,
   the post-processor includes a single unit post-processing module, and
   the single unit post-processing module calculates a quantum cryptography key by processing random numbers generated by the plurality of unit optical modules.

4. The quantum key distribution device of claim 1, wherein
   the optical unit includes a plurality of unit optical modules,
   the post-processor includes a plurality of unit post-processing modules, and
   the plurality of unit post-processing modules calculate a quantum cryptography key by processing random numbers generated by the plurality of unit optical modules.

5. The quantum key distribution device of claim 1, wherein a random number generating rate per unit time of the unit optical module is different from a random number processing rate per unit time of the unit post-processing module.

6. The quantum key distribution device of claim 1, wherein the post-processor calculates a quantum cryptography key for each protocol while operating in response to one or more protocols used in each of the unit optical modules of the optical unit.

7. The quantum key distribution device of claim 6, wherein the post-processor receives information on the protocol used in each unit optical module of the optical unit, processes a random number generated by each of the unit optical modules, and calculates a quantum cryptography key corresponding to each of the unit optical modules.

8. The quantum key distribution device of claim 6, wherein each of the unit optical modules transmits information on a link connected to a protocol that is used by each of the unit optical modules, to the post-processor.

9. The quantum key distribution device of claim 1, wherein each of the unit optical modules of the optical unit and each of the unit post-processing modules of the post-processor constitute a trusted node to distribute a quantum cryptography key with a second quantum key distribution device of another site.

10. The quantum key distribution device of claim 1, wherein the optical unit and the post-processor are provided at a first site to constitute a first quantum key distribution device, are provided at a second site to be connected to a second quantum key distribution device including a second optical unit and a second post-processor, and distribute a quantum cryptography key between the first quantum key distribution device and the second quantum key distribution device by processing random numbers generated by the plurality of unit optical modules included in the optical unit.

11. The quantum key distribution device of claim 10, wherein the plurality of unit optical modules generate the random numbers using two or more different protocols.

12. A method for distributing a quantum cryptography key between quantum key distribution devices, the method comprising:
   generating a random number using an optical unit that includes an optical element to transmit information; and
   calculating a quantum cryptography key using a post-processor by processing the random number generated by the optical unit,
   wherein, the quantum key distribution device includes one of i) the optical unit having a plurality of unit optical modules, ii) the post-processor having a plurality of unit post-processing modules, and iii) the optical unit having a plurality of unit optical modules and the post-processor having a plurality of unit post-processing modules, and
   wherein the method further comprises: increasing or decreasing, by the post-processor, the number of unit post-processing modules that operate in correspondence with the optical unit according to a change in the random number generating rate per unit time of the optical unit.

* * * * *